(12) United States Patent
Lee (10) Patent No.: US 10,001,237 B1
(45) Date of Patent: Jun. 19, 2018

(54) ANTI-LOOSENING BUCKLE AND HOSE CONNECTOR USING SAME

(71) Applicant: Yueh-Lin Lee, Taipei (TW)

(72) Inventor: Yueh-Lin Lee, Taipei (TW)

( * ) Notice: Subject to any disclaimer, the term of this patent is extended or adjusted under 35 U.S.C. 154(b) by 0 days. days.

(21) Appl. No.: 15/612,896

(22) Filed: Jun. 2, 2017

(51) Int. Cl.
*F16L 35/00* (2006.01)
*F16L 37/18* (2006.01)

(52) U.S. Cl.
CPC .................... *F16L 37/18* (2013.01)

(58) Field of Classification Search
CPC ........ F16L 37/18; F16L 37/20; F16L 2201/10
USPC ............................ 285/82, 87, 312
See application file for complete search history.

(56) References Cited

U.S. PATENT DOCUMENTS

| | | | | |
|---|---|---|---|---|
| 3,300,235 A * | 1/1967 | Blackwell, Jr. | ......... | F16L 37/18 285/312 |
| 3,439,942 A * | 4/1969 | Moore | ...................... | F16L 37/18 285/312 |
| 4,647,075 A * | 3/1987 | Vargo | ...................... | F16L 37/18 285/312 |
| 4,802,694 A * | 2/1989 | Vargo | ...................... | F16L 37/18 285/312 |
| 5,295,717 A * | 3/1994 | Chen | ...................... | F16L 37/18 285/312 |
| 5,791,694 A | 8/1998 | Fahl et al. | | |
| 5,911,445 A | 6/1999 | Lee | | |
| 5,988,693 A * | 11/1999 | Street | ...................... | F16L 37/18 285/312 |
| 6,015,168 A * | 1/2000 | Fahl | ...................... | F16L 37/18 285/312 |
| 6,053,540 A * | 4/2000 | Meyer | ...................... | F16L 37/18 285/312 |
| 6,206,431 B1 | 3/2001 | Street | | |
| 6,224,113 B1 * | 5/2001 | Chien | ...................... | F16L 37/18 285/312 |
| 6,364,369 B2 | 4/2002 | Bailey | | |
| 6,371,523 B1 * | 4/2002 | Chen | ...................... | F16L 37/18 285/312 |
| 6,543,812 B1 * | 4/2003 | Chang | ...................... | F16L 37/18 285/312 |
| 7,032,613 B2 * | 4/2006 | Delorme | ................ | F16L 37/05 137/223 |
| 8,083,265 B1 * | 12/2011 | Chen | ...................... | F16L 37/18 285/312 |
| 8,186,718 B2 * | 5/2012 | Chen | ...................... | F16L 37/18 285/312 |

(Continued)

*Primary Examiner* — Aaron M Dunwoody
(74) *Attorney, Agent, or Firm* — Pai Patent & Trademark Law Firm; Chao-Chang David Pai (57) ABSTRACT

An anti-loosening buckle mounted at the hose connector body of a hose connector for locking an adapter mouthpiece includes a locking lever, a stop device, an interlocking member, and a position-limiting member. The locking lever is pivotally connected to the hose connector body and has a cam portion and an operating grip respectively disposed at two opposite ends. The stop device is slidably coupled to the operating grip. The interlocking member is coupled between the stop device and the hose connector body. The position-limiting member is mounted at the operating grip. When the locking lever is in the locking position, the bottom side of the stop device is abutted against the position-limiting member to lock the locking lever. When the position-limiting member is pulled away from the stop device, the locking lever is released from the constraint and can be freely biased.

9 Claims, 10 Drawing Sheets (56) References Cited

U.S. PATENT DOCUMENTS

| | | | |
|---|---|---|---|
| 8,876,169 B2 * | 11/2014 | Chen | F16L 37/18 |
| | | | 285/312 |
| 9,562,639 B1 * | 2/2017 | Hartman | F16L 37/18 |
| 9,695,967 B2 * | 7/2017 | Utsch | F16L 37/1205 |
| 9,732,894 B1 * | 8/2017 | Hartman | F16L 37/18 |
| 2016/0084421 A1 | 3/2016 | Lee | |
| 2016/0084422 A1 | 3/2016 | Lee | |
| 2016/0298799 A1 | 10/2016 | Lee | |

* cited by examiner

ANTI-LOOSENING BUCKLE AND HOSE CONNECTOR USING SAME

BACKGROUND OF THE INVENTION

(a) Field of the Invention

The present invention relates to hose connector technology and more particularly to an anti-loosening buckle for a hose connector to lock an adapter mouthpiece and to prevent loosening. The invention also relates to a hose connector using the anti-loosening buckle.

(b) Description of the Prior Art

Hose connectors are commonly used with adapter mouthpieces in hose systems for delivering oil, water, or other fluids. A hose connector generally comprises a hose connector body, two locking levers pivotally mounted at the outer periphery of the hose connector body at two opposite sides. Each locking lever has a cam located at the front end and protruding into the inside of the hose connector body for locking an inserted adapter mouthpiece. Conventionally, the cam can be forced into the inside of the hose connector body to lock the inserted adapter mouthpiece only when the locking lever is biased backward (downward). Because no anti-loosening mechanism is provided, the locking lever can be accidentally biased forward (upward) to disengage the cam from the inserted adapter mouthpiece. However, a huge number of hose connectors without anti-loosening function are being used in existing industrial fluid delivering hose systems. Replacing those existing conventional hose connectors with new hose connector designs that provide an anti-loosening function can be complicated and very expensive. Simply replacing the locking levers of the existing hose connectors can save much of the cost. The consumers are also more willing to change at a lower cost. Therefore, an inexpensive and easy-to-install locking lever with anti-loosening function is urgently needed.

There are known various safety hose connector buckles. Exemplars are seen in U.S. Pat. No. 6,206,431, U.S. Pat. No. 6,364,369, U.S. Pat. No. 5,791,694 and U.S. Pat. No. 5,911,445. U.S. Pat. No. 6,206,431 teaches the use of a safety locking coupling assembly to achieve anti-loosening. U.S. Pat. No. 6,364,369 is characterized by the arrangement of a recess to match with the locking member (locking lever), thus, the whole hose connector must be replaced. Complete replacement results in a high cost. U.S. Pat. No. 5,791,694 discloses the use of a locking mechanism to secure the recess of the cam arm, however, this design is difficult to control the locking tightness. If the locking mechanism locks the recess of the cam arm excessively tight, the user will be unable to open the cam arm. On the contrary, if the locking mechanism locks the recess of the cam arm in a loose manner, the locking effect will fail. Further, the design of U.S. Pat. No. 5,911,445 does not allow the user to directly pull the interlocking member in unlocking the locking lever. In the unlocking operation, the user must operate the knob and then bias the locking lever, causing inconvenience in operation.

SUMMARY OF THE INVENTION

The present invention has been accomplished under the circumstances in view. It is the main object of the present invention to provide an anti-loosening buckle and a hose connector using same, which allows installation of the anti-loosening buckle in an existing hose connector to provide an anti-loosening function without complete replacement of the hose connector.

It is another object of the present invention to provide an anti-loosening buckle and a hose connector using same, which automatically initiates the anti-loosening function when the locking lever of the anti-loosening buckle is biased backward (downward) to lock the inserted adapter mouthpiece, prohibiting the locking lever from being biased forward (upward) accidentally.

To achieve these and other objects of the present invention, an anti-loosening buckle is adapted for mounting at one side of a hose connector body to lock an inserted adapter mouthpiece. The anti-loosening buckle comprises a locking lever, a stop device, an interlocking member and a position-limiting member. The locking lever has a cam portion located at a first end thereof and pivotally connected to the hose connector body at a first location, and an operating grip located at an opposing second end thereof. The stop device is vertically slidably coupled to the operating grip, comprising a stopper protrusion located adjacent an outer surface of the operating grip. The interlocking member has a top side thereof pivotally connected to the hose connector body at a second location, and an opposing bottom side thereof inserted through the stop device. When the locking lever is biased downward from an unlocking position to a locking position, the interlocking member is forced to move the stop device upwardly along the operating grip. The position-limiting member is inserted through the operating grip of the locking lever, and is forced by the elastic restoring force thereof to abut against the outer surface of the operating grip. When the locking lever is set in the locking position, the bottom side of the stopper protrusion of the stop device is stopped at the position-limiting member to prohibit biasing of the locking lever. Further, the position-limiting member can be pulled away from the outer surface of the operating grip to unlock the locking lever.

To achieve these and other objects of the present invention, a hose connector comprises a hose connector body defining a tubular receptacle, two pivot blocks respectively located at an outer periphery of the hose connector body at two opposite sides, an opening transversely cut through each of the pivot blocks and the receptacle, and two anti-loosening buckles respectively pivotally connected to the pivot blocks for locking an adapter mouthpiece to the tubular receptacle of the connector body. The first location and the second location of each anti-loosening buckle are respectively located on the two first pivot holes and the two second pivot holes of the respective pivot block. The cam portion of the locking lever of each anti-loosening buckle is inserted from a respective one end of the opening into the inside of the receptacle.

The anti-loosening buckle can be directly installed in the hose connector body of a conventional hose connector, enabling the conventional hose connector to provide an anti-loosening function, saving the cost. Further, when the locking lever of the anti-loosening buckle of the present invention is biased backward (downward) to lock the inserted adapter mouthpiece, the anti-loosening function is automatically enabled. Thus, the operation of the present invention is quite simple.

Other advantages and features of the present invention will be fully understood by reference to the following specification in conjunction with the accompanying drawings, in which like reference signs denote like components of structure.

DETAILED DESCRIPTION OF THE PREFERRED EMBODIMENTS

Figure 1:
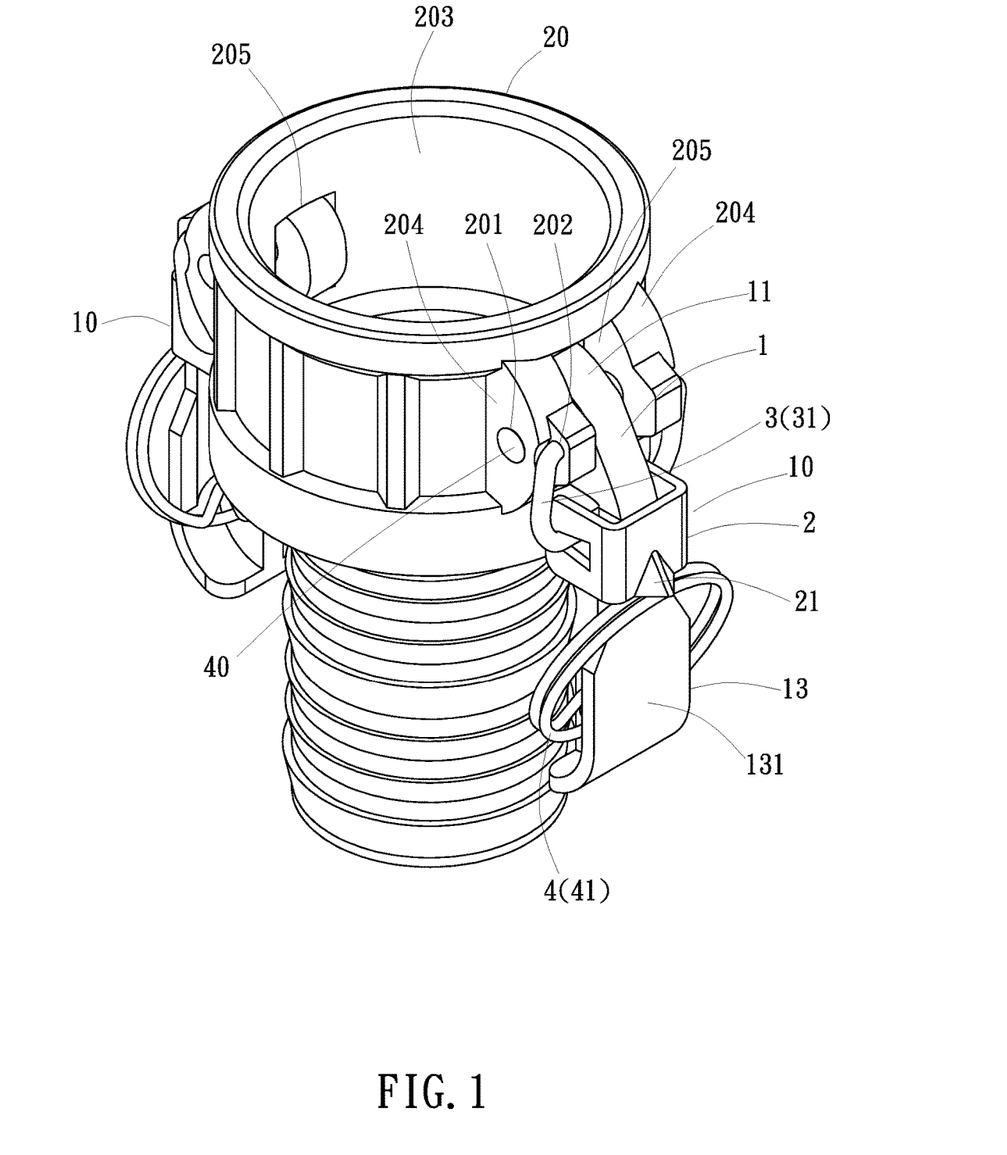
FIG. 1 is an oblique top elevational view of a hose connector with the anti-loosening buckles in accordance with the present invention.
Figure 2:
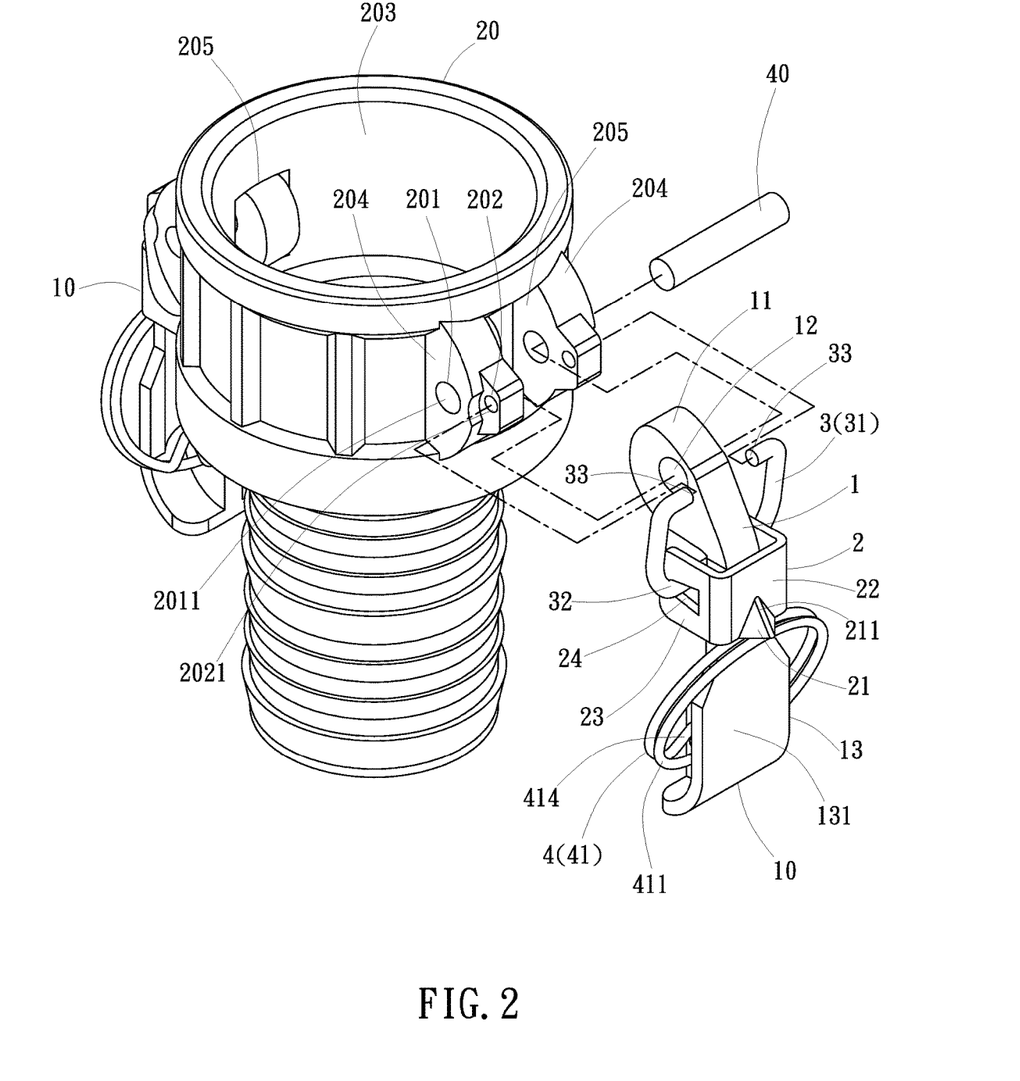
FIG. 2 is an exploded view of the hose connector with the anti-loosening buckles shown in FIG. 1.

Referring to FIG. 1 and FIG. 2, an anti-loosening buckle 10 is mounted at one side of a hose connector body 20 for clamping on an adapter mouthpiece 30 (see FIG. 6) of the hose connector body 20.

Figure 3:
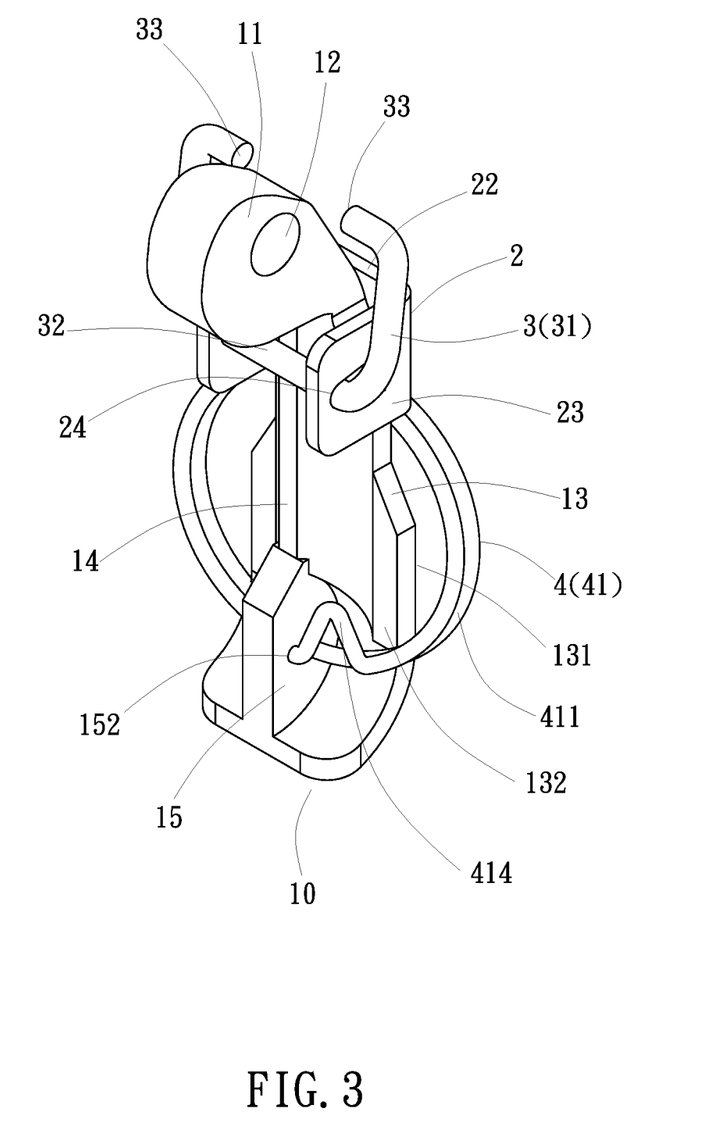
FIG. 3 is an oblique top elevational assembly view of one anti-loosening buckle used in the hose connector shown in FIG. 1.
Figure 4:
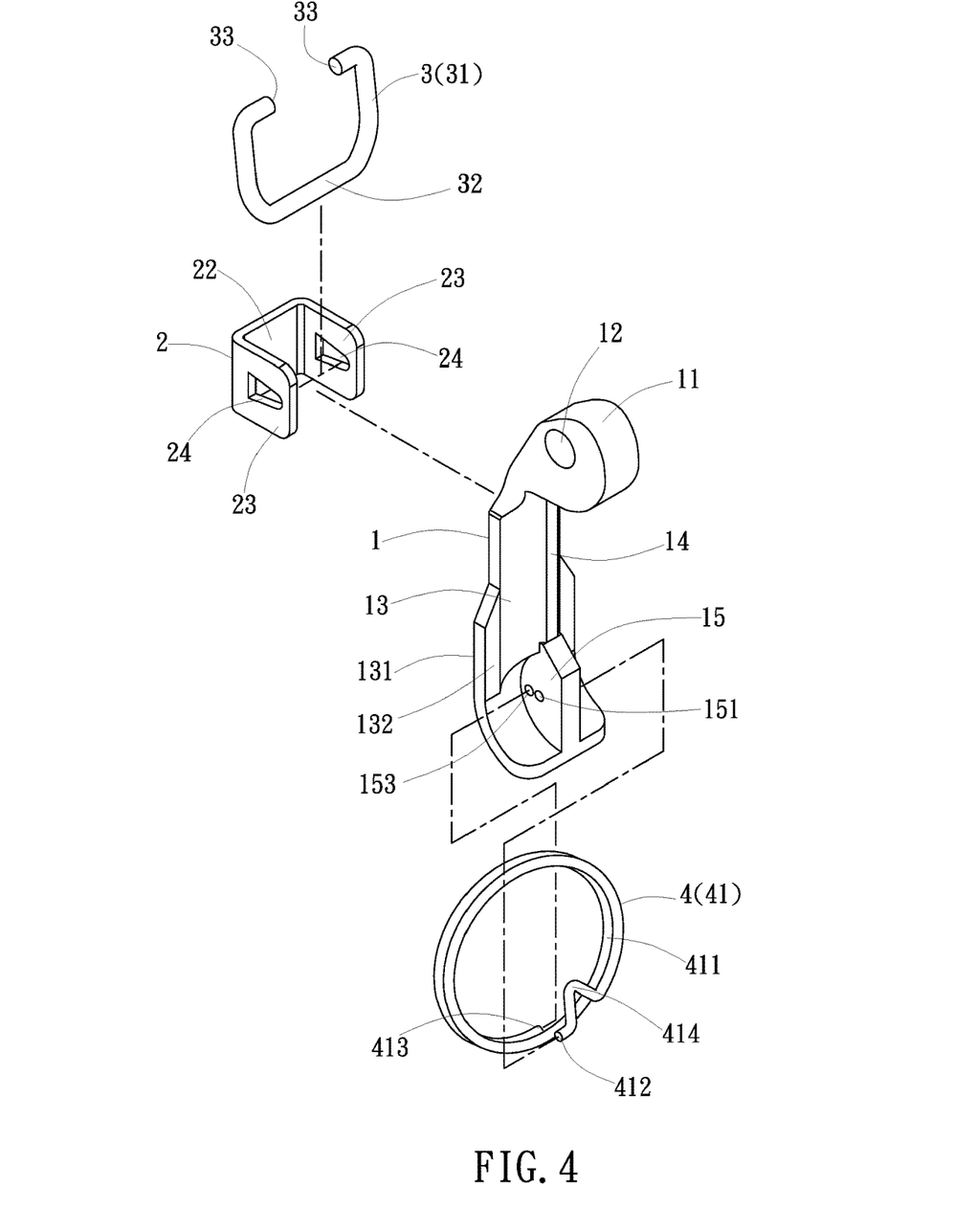
FIG. 4 is an exploded view of the anti-loosening buckle shown in FIG. 3.
Figure 5:
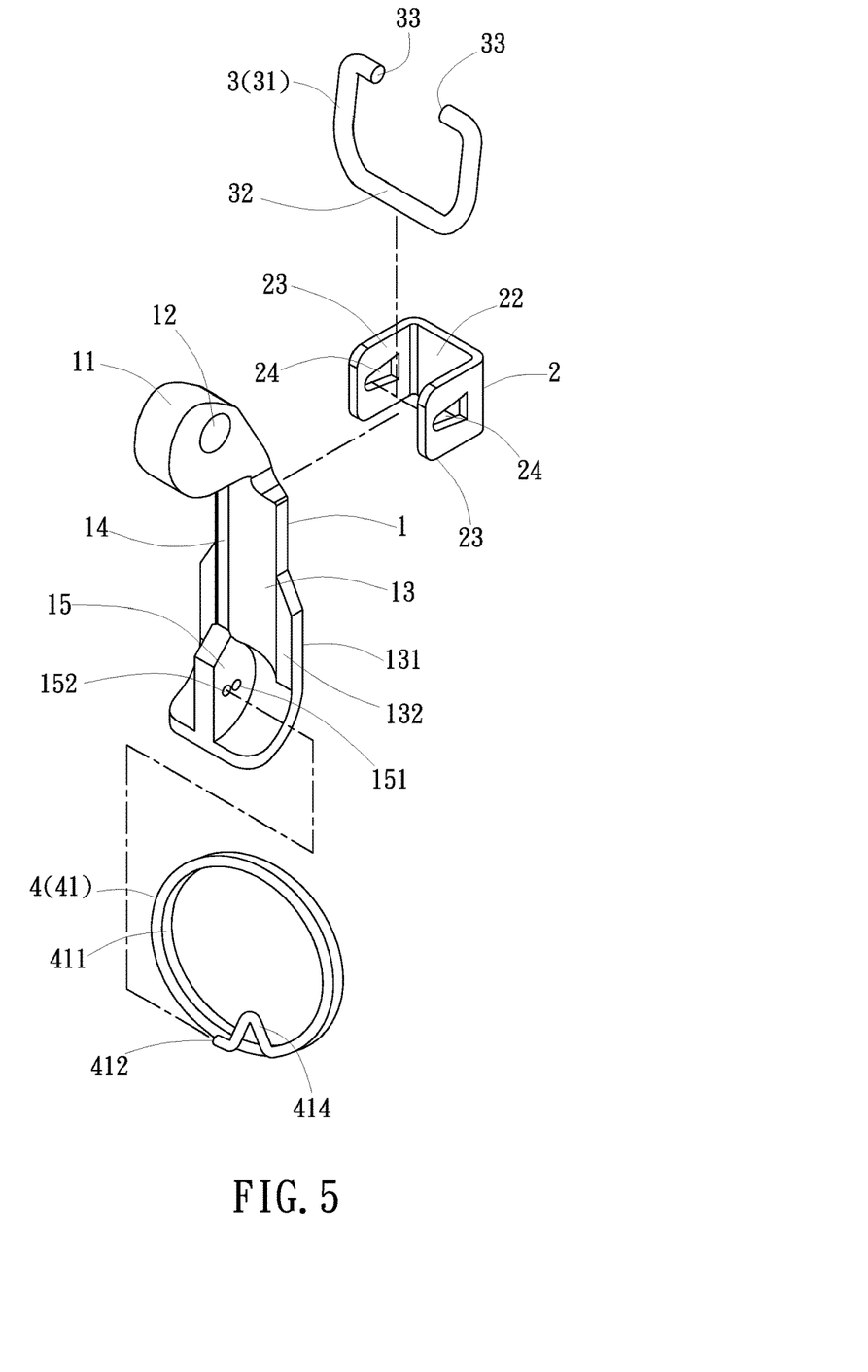
FIG. 5 corresponds to FIG. 4 when viewed from another angle.

As illustrated in FIG. 3, FIG. 4 and FIG. 5, the anti-loosening buckle 10 comprises a locking lever 1, a stop device 2, an interlocking member 3 and a position-limiting member 4. The locking lever 1 is adapted for mounting at one side of the hose connector body 20 to lock the adapter mouthpiece 30 (in actual application, two or four anti-loosening buckles can be equiangularly mounted around the outer periphery of the hose connector body). The locking lever 1 comprises a cam portion 11 located at a first end thereof, a first axle hole 12 cut through the cam portion 11 and adapted for pivotally connecting to the hose connector body 20 at a first location 201, an operating grip 13 located at an opposing second end thereof and defining an outer surface 131 and an opposing inner surface 132, a rib 14 located at the inner surface 132 of the operating grip 13, and a position-limiting member mounting block 15 located at the inner surface 132 of the operating grip 13 and connected to a bottom end of the rib 14. The stop device 2 is vertically slidably coupled to the operating grip 13, and comprises a stopper protrusion 21 disposed at the outer surface 131 of the operating grip 13 and slidable up and down with the stop device 2. The interlocking member 3 has a top side thereof pivotally connected to the hose connector body 20 at a second location 202, and an opposing bottom side thereof inserted through the stop device 2. Thus, when the locking lever 1 is biased backward (downward) toward a locking position, the interlocking member 3 is forced to move the stop device 2 upwardly along the operating grip 13 (see FIG. 10 and FIG. 6). On the contrary, when the locking lever 1 is biased forward (upward) from the locking position toward an unlocking position, the interlocking member 3 is forced to move the stop device 2 downwardly along the operating grip 13 (see FIGS. 7-9). The position-limiting member 4 is inserted through the position-limiting member mounting block 15 at the bottom side of the operating grip 13 of the locking lever 1. The position-limiting member 4 is normally forced by the elastic restoring energy thereof to abut against the outer surface 131 of the operating grip 13. When the locking lever 1 is in the locking position, the bottom side of the stopper protrusion 21 of the stop device 2 is abutted against the position-limiting member 4 (see FIG. 6), forming an anti-loosening mechanism. Further, the position-limiting member 4 can be pulled by the user toward two opposite lateral sides to move away from the outer surface 131 of the operating grip 13 (see FIG. 7), allowing the locking lever 1 to be further biased forward (upward) (see FIG. 8 and FIG. 9) to disengage the cam portion 11 from the adapter mouthpiece 30.

According the principle that the interlocking member 3 carries the stop device 2 to slide upward or downward when the locking lever 1 is being biased backward (downward), the first location 201 and the second location 202 are located on one lateral side of the hose connector body 20 and spaced from each other at a predetermined distance. Thus, when the locking lever 1 is turned about the first location 201 as a fulcrum, the interlocking member 3 is turned about the second location 202 as a fulcrum (see FIGS. 8-10), and thus the interlocking member 3 can carry the stop device 2 to slide upward or downward as the locking lever 1 is being biased.

As illustrated in FIG. 2, FIG. 4 and FIG. 5, the stop device 2 substantially comprises a base plate 22 abutted at the outer surface 131 of the operating grip 13, and two pivot connection lugs 23 respectively and integrally connected with two opposite lateral sides of the base plate 22. The base plate 22 has a part of a bottom side thereof forming the aforesaid stopper protrusion 21. The stopper protrusion 21 defines a bevel edge 211 at a top side thereof. The bevel edge 211 is connected to an outer surface of the base plate 22. The two pivot connection lugs 23 each define therein a first through hole 24. Thus, the bottom side of the interlocking member 3 is inserted through the first through holes of the two pivot connection lugs 23. Preferably, the interlocking member 3 is a C-shaped ring 31 that comprises a ring body 32 inserted through the first through holes 24, and two opposing end portions 33 pivotally connected to the hose connector body 20 at the second location 202.

As illustrated in FIG. 3, FIG. 4 and FIG. 5, the position-limiting member mounting block 15 at the operating grip 13 of the locking lever 1 comprises a through hole 151 cut through two opposite lateral sides thereof, a first plug hole 152 located on one lateral side and disposed adjacent to the through hole 151, and a second plug hole 153 located on the other lateral side and disposed adjacent to the through hole 151. Preferably, the position-limiting member 4 is a coil 41 of two turns. The coil 41 can be an oval coil, circular coil or rectangular coil, and comprises a coil body 411 inserted through the through hole 151, and two opposite end pieces 412,413 respectively plugged in the first plug hole 152 and the second plug hole 153. Subject to the arrangement of the through hole 151, the first plug hole 152 and the second plug hole 153, the coil 41 is elastically abutted against the outer surface 131 of the operating grip 13 after installation (see FIG. 6). The coil 41 can be pulled toward a lateral side and moved away from the outer surface 131 of the operating grip 13 (see FIG. 7). Further, the coil 41 can be configured to provide a curved portion 414. When the coil 41 is pulled away from the outer surface 131 of the operating grip 13, the curved portion 414 is elastically abutted against the inner surface 132 of the operating grip 13, causing the coil 41 to create an elastic restoring force to prevent the coil 41 from been permanently deformed when pulled over 90° angle. Thus, the anti-loosening mechanism can be ensured.

As illustrated in FIG. 1 and FIG. 2, the hose connector body 20 comprises a tubular receptacle 203, two pivot blocks 204 located at an outer periphery of the receptacle 203 at two opposite sides, and an opening 205 transversely cut through each of the two opposite pivot blocks 204 and the peripheral wall of the receptacle 203. Further, each pivot block 204 defines two first pivot holes 2011 and two second pivot holes 2021 that respectively form the aforesaid first location 201 and second location 202 respectively. Thus, when mounting the anti-loosening buckle 10, insert the cam portion 11 of the locking lever 1 through one end of the opening 205, into the inside of the receptacle 203, and then insert a pivot pin 40 through one of the first pivot holes 2011 of the first location 201, the first axle hole 12 and through the other of the first pivot holes 2011, and then insert the two opposing end portions 33 of the C-shaped ring 31 (i.e. the interlocking member 3) into the second pivot holes 2021 of the second location 202. Thus, the anti-loosening buckle 10 is installed in the hose connector body 20 in a replaceable manner.

Figure 6:
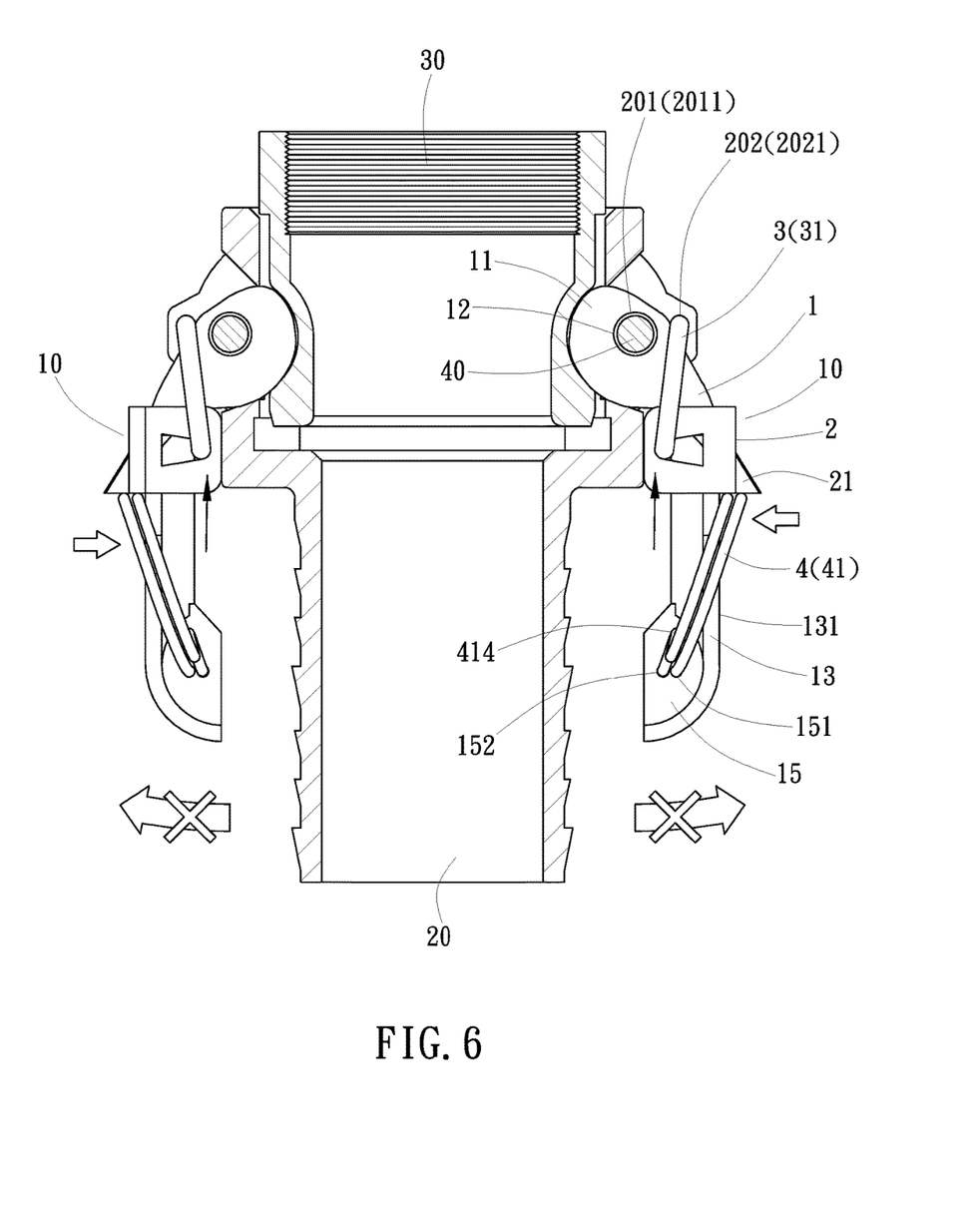
FIG. 6 is a schematic view of the application of the present invention, illustrating the locking operation of the anti-loosening buckle.
Figure 7:
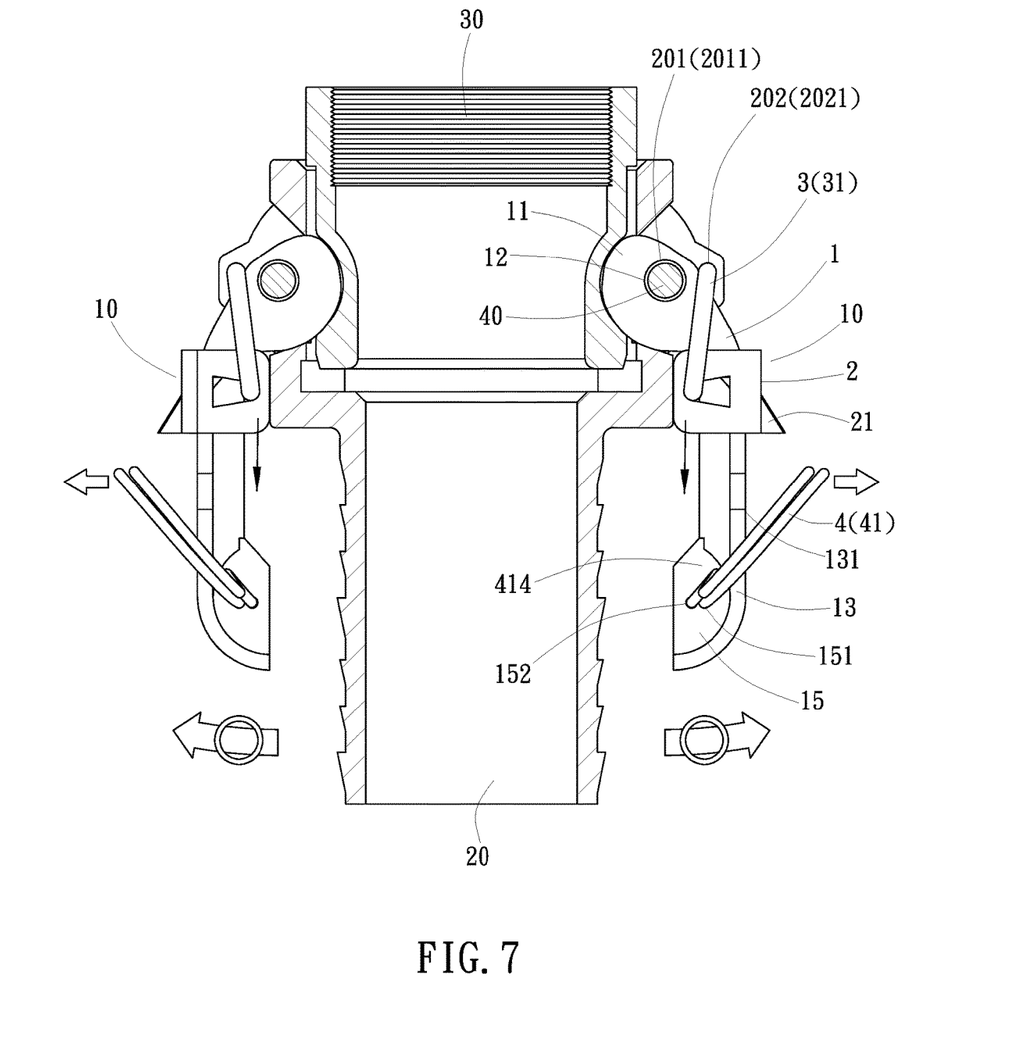
FIG. 7 is a schematic view of the application of the present invention, illustrating the locking lever being biased from the locking position to the unlocking position.
Figure 8:
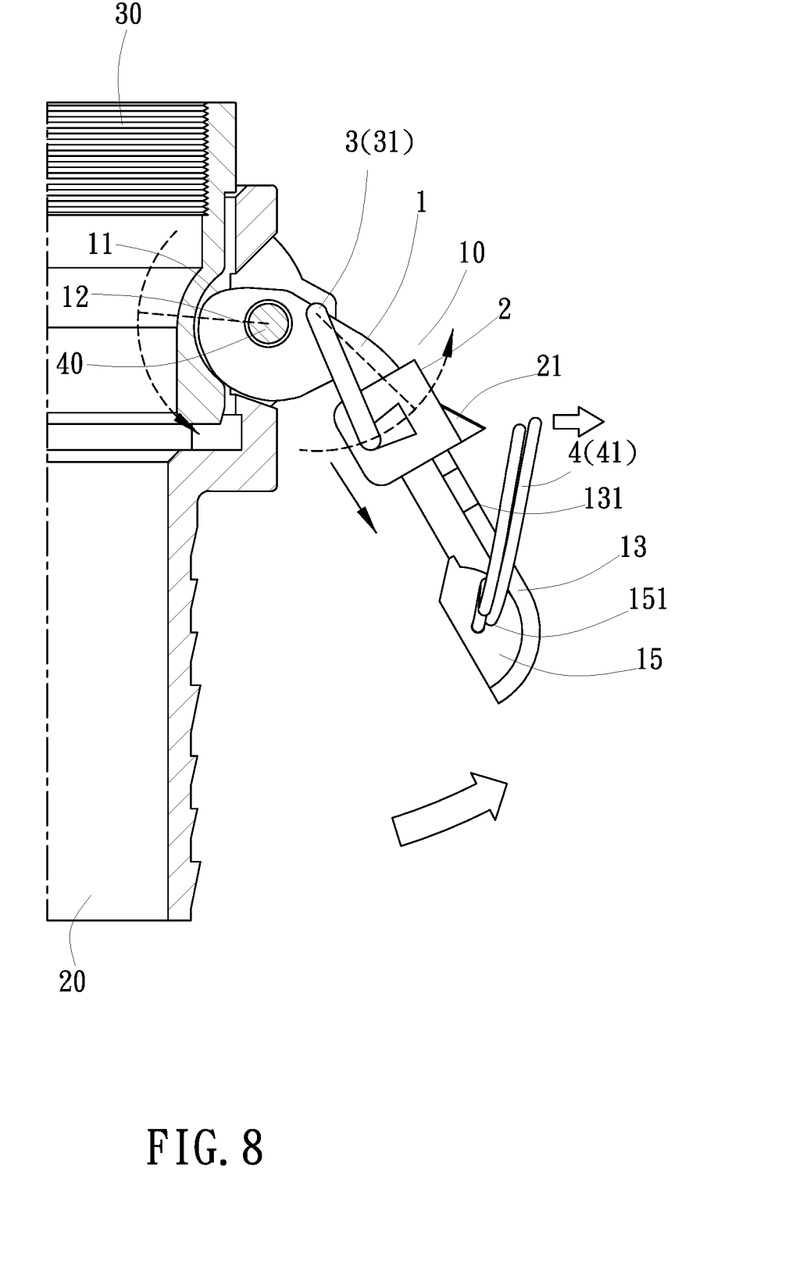
FIG. 8 corresponds to FIG. 7, illustrating the locking lever being released from the constraint and biased upward from the unlocking position toward the locking position.
Figure 9:
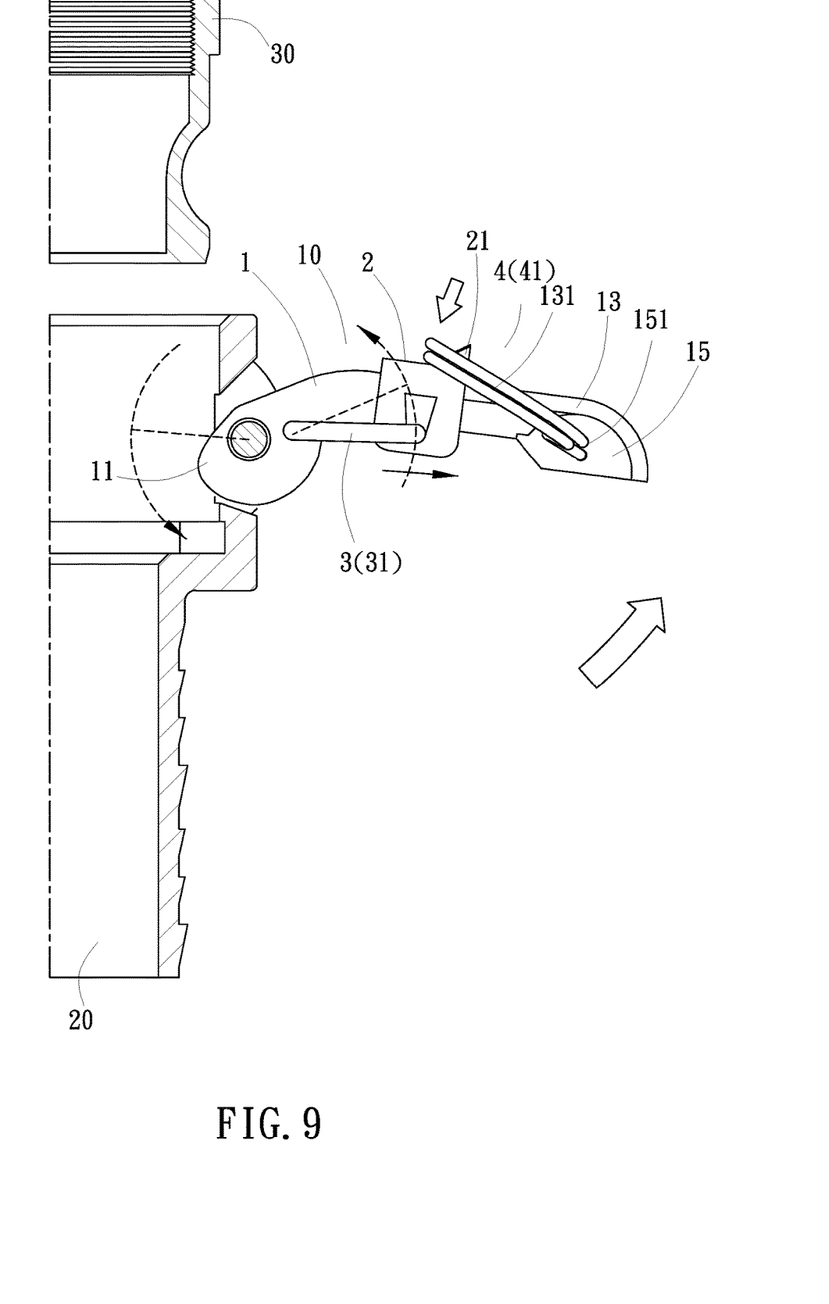
FIG. 9 corresponds to FIG. 8, illustrating the locking lever being biased upward from the unlocking position toward the locking position and the position-limiting member being returned to its previous position.
Figure 10:
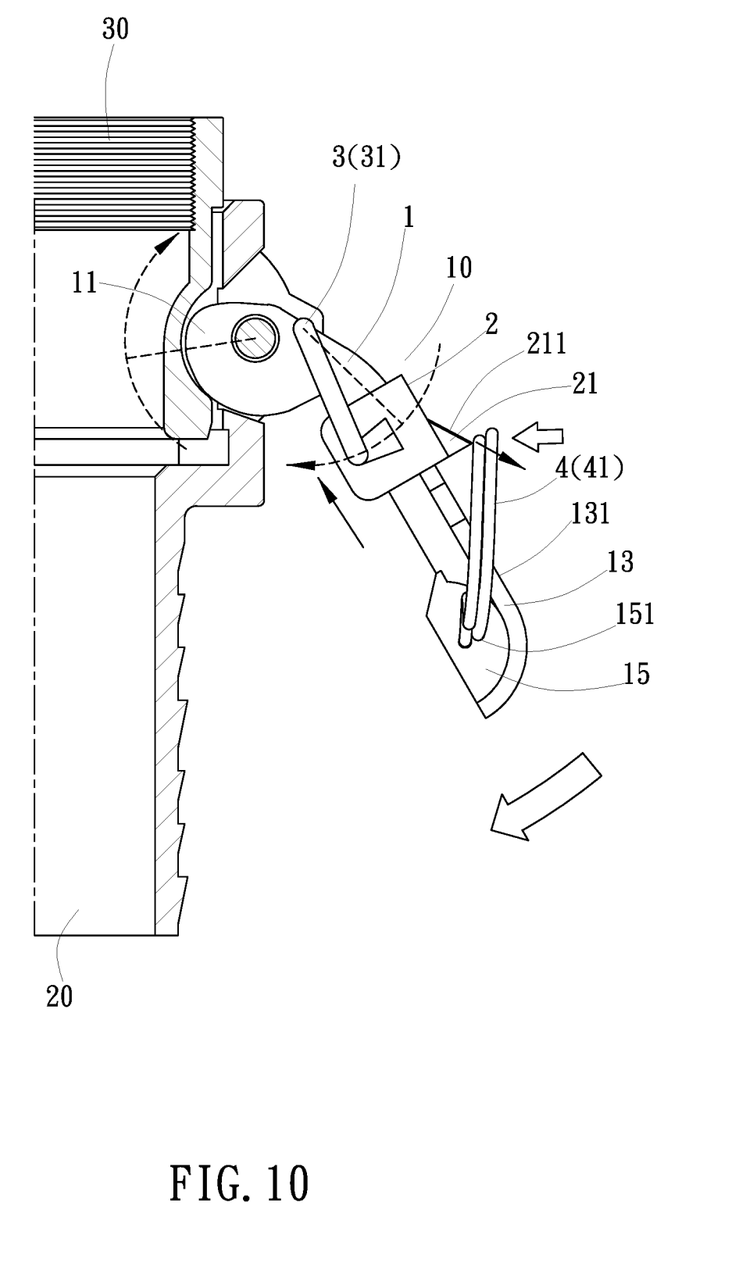
FIG. 10 corresponds to FIG. 9, illustrating the movement of the position-limiting member during downward biasing of the locking lever.

When locking the inserted adapter mouthpiece 30, as illustrated in FIG. 6, bias the locking lever 1 backward (downward) to force the cam portion 11 into engagement with the adapter mouthpiece 30. At this time, the bottom side of the stopper protrusion 21 of the stop device 2 is abutted against the coil 41 of the position-limiting member 4 to stop the locking lever 11 from forward (upward) biasing, achieving the expected anti-loosening effect. When unlocking the adapter mouthpiece 30, as illustrated in FIG. 7, pull the coil 41 of the position-limiting member 4 toward a lateral side to disengage the coil 41 from the stopper protrusion 21, thereafter, as illustrated in FIG. 8 and FIG. 9, bias the locking lever 11 forward (upward) to unlock the adapter mouthpiece 30. When the user releases the pressure from the coil 41 of the position-limiting member 4 after the adapter mouthpiece 30 is unlocked, the elastic restoring force of the coil 41 forces the coil 41 toward the stopper protrusion 21 of the stop device 2 (see FIG. 9). Thus, in order to lock the adapter mouthpiece 30 again, the user simply needs to bias the locking lever 11 backward (downward), at this time, the coil 41 will move downward along the bevel edge 211 of the stopper protrusion 21 (see FIG. 10) into abutment against the outer surface 131 of the operating grip 13 where the coil 41 is stopped at the bottom side of the stopper protrusion 21 again (see FIG. 6).

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An anti-loosening buckle for mounting at one side of a hose connector body to lock an inserted adapter mouthpiece, the anti-loosening buckle comprising a locking lever, a stop device, an interlocking member and a position-limiting member, wherein:

said locking lever comprises a cam portion located at a first end thereof and pivotally connecting to said hose connector body at a first location and an operating grip located at an opposing second end thereof, said operating grip defining an outer surface and an opposing inner surface, said locking lever being biasable relative to said hose connector body between a locking position and an unlocking position;

said stop device is coupled to and slidable along a length of said operating grip, comprising a stopper protrusion adapted for abutting against said position-limiting member to hold down said locking lever in said locking position; said interlocking member has a first side thereof pivotally connected to said hose connector body at a second location, and an opposing second side thereof inserted through said stop device and adapted for moving said stop device to slide along said operating grip in a direction from the second end towards the first end of said locking lever when said locking lever is biased downward from said unlocking position to said locking position;

said position-limiting member is inserted through said operating grip of said locking lever and abutted against the said outer surface of said operating grip subject to an elastic restoring force thereof, said position-limiting member being movable away from the said outer surface of said operating grip by an external force for allowing said locking lever to be biased from said locking position to said unlocking position.

2. The anti-loosening buckle as claimed in claim 1, wherein said first location and said second location of said hose connector body are located on an outer periphery of said hose connector body at one lateral side on substantially the same level relative to an end of said hose connector body and spaced from each other.

3. The anti-loosening buckle as claimed in claim 1, wherein said stop device comprises a base plate abutted at the said outer surface of said operating grip, and two pivot connection lugs respectively and integrally connected to two opposite lateral sides of said base plate, said base plate having a first end facing towards the first end of said locking lever and a second end facing towards the second end of said locking lever, an outer surface of said base plate having a part adjoining the second end of said base plate and forming said stopper protrusion, said two pivot connection lugs each defining therein a first through hole; and said second side of said interlocking member is inserted through the said first through holes of said two pivot connection lugs.

4. The anti-loosening buckle as claimed in claim 3, wherein said stopper protrusion defines a bevel edge on a side thereof facing towards the first end of the locking lever, said bevel edge being connected to an outer surface of said base plate.

5. The anti-loosening buckle as claimed in claim 3, wherein said interlocking member is a C-shaped ring comprising a ring body inserted through the said first through holes of said two pivot connection lugs, and two opposite end portions respectively pivotally connected to said hose connector body at said second location.

6. The anti-loosening buckle as claimed in claim 1, wherein said operating grip of said locking lever comprises a through hole cut through two opposite lateral sides thereof, a first plug hole located on one of the lateral sides and disposed adjacent to the said through hole of said operating grip and a second plug hole located on the other lateral side and disposed adjacent to the said through hole of said operating grip; said position-limiting member is a coil of two turns, said coil comprising a coil body inserted through the said through hole of said operating grip of said locking lever and two end pieces respectively plugged in said first plug hole and said second plug hole.

7. The anti-loosening buckle as claimed in claim 6, wherein said coil further comprises a curved portion adapted for abutting against the said inner surface of said operating grip when said coil is pulled away from the said outer surface of said operating grip by an external force.

8. The anti-loosening buckle as claimed in claim 6, wherein said coil is an oval coil, a circular coil or a rectangular coil.

9. A hose connector using a plurality of the said anti-loosening buckles as claimed in claim 1, comprising a hose connector body defining a tubular receptacle, two pivot blocks respectively located at an outer periphery of said hose connector body at two opposite sides, an opening transversely cut through each of said pivot blocks and said receptacle, and two said anti-loosening buckles respectively pivotally connected to said pivot blocks for locking an adapter mouthpiece to said tubular receptacle of said connector body, the said first location and said second location of each said anti-loosening buckle being respectively located on two first pivot holes and two second pivot holes of the respective said pivot block, the said cam portion of the said locking lever of each of said anti-loosening buckles being inserted from a respective one end of said opening into the inside of said receptacle.

\* \* \* \* \*